(12) United States Patent
Suehara

(10) Patent No.: US 6,846,441 B2
(45) Date of Patent: Jan. 25, 2005

(54) METHOD FOR RECYCLING USED-UP PLASTIC PRODUCTS AND WASHING PROCESS OF CRUSHED PLASTIC AND APPARATUS THEREFOR

(75) Inventor: Kazuyoshi Suehara, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 336 days.

(21) Appl. No.: 09/955,051

(22) Filed: Sep. 19, 2001

(65) Prior Publication Data

US 2002/0033550 A1 Mar. 21, 2002

(30) Foreign Application Priority Data

Sep. 19, 2000 (JP) ........................................ 2000-284370

(51) Int. Cl.[7] ........................ B29B 17/02; B29C 45/42
(52) U.S. Cl. .................. 264/140; 264/328.17; 264/921
(58) Field of Search .............................. 264/39, 37.33, 264/37.27, 140, 328.17, 921

(56) References Cited

U.S. PATENT DOCUMENTS

| | | | |
|---|---|---|---|
| 4,379,525 A | * 4/1983 | Nowicki et al. | ............... 241/20 |
| 4,453,905 A | 6/1984 | Bennett | |
| 4,952,132 A | * 8/1990 | Lundquist | ................... 425/197 |
| 4,968,463 A | * 11/1990 | Levasseur | ................. 264/40.1 |
| 4,970,043 A | * 11/1990 | Doan et al. | ................. 264/237 |
| 5,075,057 A | * 12/1991 | Hoedl | ......................... 264/115 |
| 5,185,041 A | 2/1993 | Anderson et al. | |
| 5,600,391 A | 2/1997 | VanDeMoere et al. | |
| 5,961,054 A | * 10/1999 | Nishibori | ..................... 241/19 |
| 6,071,462 A | * 6/2000 | Putsch | .................... 264/328.14 |
| 6,205,060 B1 | * 3/2001 | Sanda et al. | ............ 365/189.04 |
| 6,270,703 B1 | * 8/2001 | Wildman et al. | .............. 264/39 |
| 6,588,597 B2 | * 7/2003 | Arakane et al. | ................ 209/4 |

FOREIGN PATENT DOCUMENTS

| | | | |
|---|---|---|---|
| EP | 0 289 875 | 4/1988 | |
| JP | 2640786 | 1/1993 | ............ B29B/17/02 |
| JP | 2604262 | 1/1997 | ............ G03C/11/24 |
| JP | 2717020 | 11/1997 | ........... H04N/1/403 |
| WO | WO 96/34729 | 11/1996 | |
| WO | WO 99/25493 A1 | 5/1999 | |
| WO | WO 00/75726 A1 | 12/2000 | |

OTHER PUBLICATIONS

Abstracts for AU 2879095, dated Nov. 21, 1996.
Abstracts for JP 10–047485, dated Feb. 20, 1985.

\* cited by examiner

*Primary Examiner*—Jill L. Heitbrink
(74) *Attorney, Agent, or Firm*—Sughrue Mion, PLLC

(57) ABSTRACT

An object of the invention is to provide a method and an apparatus for recycling plastics which is improved with respect to operation efficiency, operation environment, lowering degradation of plastics, recycling cost and environment load including saving energy. The recycling is made as follows: coarse-crushing used-up plastic products, separating plastic materials from other foreign matters by air blow separation, fine-crushing the separated plastics, washing the fine-crushed plastics by the process using a circulation flow including a spiral flow in which interaction between crushed plastics helps themselves clean without washing agents, dewatering the washed plastics, drying them, removing metallic matters by using metal detector, then feeding them directly without pelletizing to an injection molding machine of which nozzle part is equipped with filter and flow-switching mechanism for cleaning the filter by backwash reverse filtration.

22 Claims, 14 Drawing Sheets

METHOD FOR RECYCLING USED-UP PLASTIC PRODUCTS AND WASHING PROCESS OF CRUSHED PLASTIC AND APPARATUS THEREFOR

FIELD OF THE INVENTION

This invention relates to recycling method for used-up plastic products by crushing, and washing method and apparatus for the crushed plastics.

BACKGROUND OF THE INVENTION

These days it is important how to recycle or reuse the plastic materials which have been sold and used-up once and finished their lives in order to protect environment, to save total energy and maybe reduce the cost. On the market are a variety of Film with Lens Units(so-called Single-Use camera) with simple photographing mechanism and preloaded photographic film. Most of components of the Film with Lens Units is made of plastic, so the same issue is with them. Generally used-up plastic products or components are contaminated by a variety of materials and accompanied by a lot of foreign matters, which are not eliminated completely by a conventional recycling process including separation and/or washing.

In the recycling process line of Film with Lens units, used-up products are separated according to the model and transported to respective disassembling lines where papers or labels covering the outside are removed and disassembled into respective components. Components are classified into two categories, i.e. reusing components and re-treating (recycling in narrow sense) ones. Reusing components are to be reused as components in the newly-manufactured products after being examined on the function, washed/cleaned and adjusted and re-treating components are to be used as re-treated raw materials for the newly-manufactured products.

The re-treating components from Film with Lens Unit are such ones as a front cover, a rear cover, a body portion where the film is loaded and a film winding knob, which are made of thermoplastic resin. Those retreating components are crushed into small pieces (chips)by a crusher.

The crushed plastics are washed by a shower of washing liquid to eliminate contamination and foreign matters. Japanese patents, NO. 2604262, No. 2640786 and No. 2717020 show that mixture of crushed plastics and washing liquid are stirred in a washing tank, washing liquid uses surfactants and washing tank having tapered bottom is equipped with agitating blade. The crushed plastics are dried after washing, then are molten by heating. The molten plastic is fed to an extruder to form pellet of cylindrical shape (pelletizing). Those pellets are used-up by themselves or together with a virgin plastics for molding such components as a front cover, a rear cover, a body portion where the film is loaded and a film winding knob.

However, the pelletizing process demands a lot of heating energy and water consumption and yet quickens thermal degradation of plastics, specially that of the used-up plastic as it is heated to melt at least twice while once as for virgin plastic. The thermal degradation lowers physical properties such as mechanical strength and heating may produce some materials which gives ill effect to photographic quality.

As for washing, shower is not enough to remove the contamination and foreign matters. Thus a filter installed in the extruder is often blocked with the foreign matters. Operation of exchanging the filter is not easy because of high temperature, which lowers productivity. Available semi-automatic filter exchanger is very expensive. Aforementioned stirred tank washing apparatus with agitating blade can be available instead of shower-type washer. However, if clashed plastics is equal to or lighter than the washing liquid in specific gravity, which makes it difficult to wash every pieces of crushed plastics equally and to drain the crushed plastics and the washing liquid together after finishing washing because they are separated and the crushed plastics tend to float according to the respective specific gravity.

It is proposed that crushed plastic tips lighter than the washing liquid is washed in the washing tank while being in a netlike basket. However, it is troublesome and take a long time to put the plastics in the basket, handle the basket to set in the washing tank and take out them to evacuate the basket, which causes the washing apparatus to be complex and makes it difficult to automate the system.

Use of organic solvents or CFCs (chlorofluorocarbons) and other surfactants to increase washing power is not preferable these days in terms of operation environment in the site, running cost, liquid waste treatment cost and living environment.

SUMMARY OF THE INVENTION

An object of the invention is to provide a method and an apparatus for recycling plastics which is improved with respect to operation efficiency, operation environment, lowering degradation of plastics, recycling cost and environment load including saving energy.

Another object of the invention is to provide washing method and apparatus for washing crushed plastics completely without using special detergent or organic solvent with high efficiency.

Method for recycling a used-up plastic products of the invention is performed by crushing the plastics and feeding the crushed ones directly to a molding process as raw materials without pelletizing treatment. Injection molding machine used in the molding process has a filter installed in the nozzle section to be able to remove foreign matter mingled in the crushed plastics just before injecting a molten plastic into the die.

Washing process of the invention to clean the crushed plastics is performed by forming a circulation flow including a spiral flow of mixture consisting of the crushed plastics and washing liquid. The crushed plastics can grind or scrape each other in the spiral flow of the crushed plastics and washing liquid in both of the circulation pipeline and the washing tank. Mixing bubbles in the washing liquid can increase the washing power.

Apparatus for washing crushed plastics comprises a washing tank formed with a tubular shell portion and a conical bottom portion for receiving a mixture of crushed plastics of used-up plastic product and washing liquid which includes a sink hole in the bottom portion into which the mixture is to flow, circulation pipeline for flowing back the mixture into the washing tank one end of which is connected to the sink hole and the other end portion is disposed near and approximately along the inner wall of the washing tank so as to make a spiral flow, and a washing liquid feeding pump outlet of which is connected to the circulation pipeline via a discharging pipe to make backflow of the mixture in the circulation pipeline toward the washing tank by feeding washing liquid into the circulation pipeline.

Further, plural holes through which only the crushed plastic smaller than predetermined size pass may be formed at a part of the tubular shell portion of the washing tank, in order to remove crushed plastics smaller than predetermined size from the washing tank.

Furthermore, after mixing bubbles in the washing liquid, it increases a washing power by a cabitation effect to feed the bubbled washing liquid from an air intake disposed between the washing liquid feeding pump and washing liquid feeding pump outlet to a nozzle port. Accordingly, the washing power will be enough even though a hot water is used as a washing liquid.

The discharging pipe may include an air intake to mix bubbles in the mixture. Position of the air intake can be shifted as long as the washing liquid at the shifted position has a reduced/negative pressure.

In the method for recycling the used plastic, as it is recycled without pelletizing, it is prevented that the physical property becomes lower and the materials having bad influence on the photographic property is produced. Therefore, the bad smell and the amount of the drainage are decreased and the environment becomes better. At the same time, as the plastics are not palletized, the environment in the fabrics are improved, such as preventing the high temperature, the bad smell, and dangers. The cost for produce becomes lower by saving the energy, decreasing the number of the processes for recycling, and automatic operation.

Further, the crushed plastics which hardly disperse and are not easily washed can be washed in a short time. The strong washing power is obtained by using only the hot water without the cleaning material, which makes the treatment of the drainage easily and the cost lower, has only a small influence on the environment, and improves the environment in the fabrics. Further, as complex mechanical parts are not used, the maintenance is excellent and process of the method becomes automatic.

DETAILED DESCRIPTION OF THE INVENTION

Figure 1:
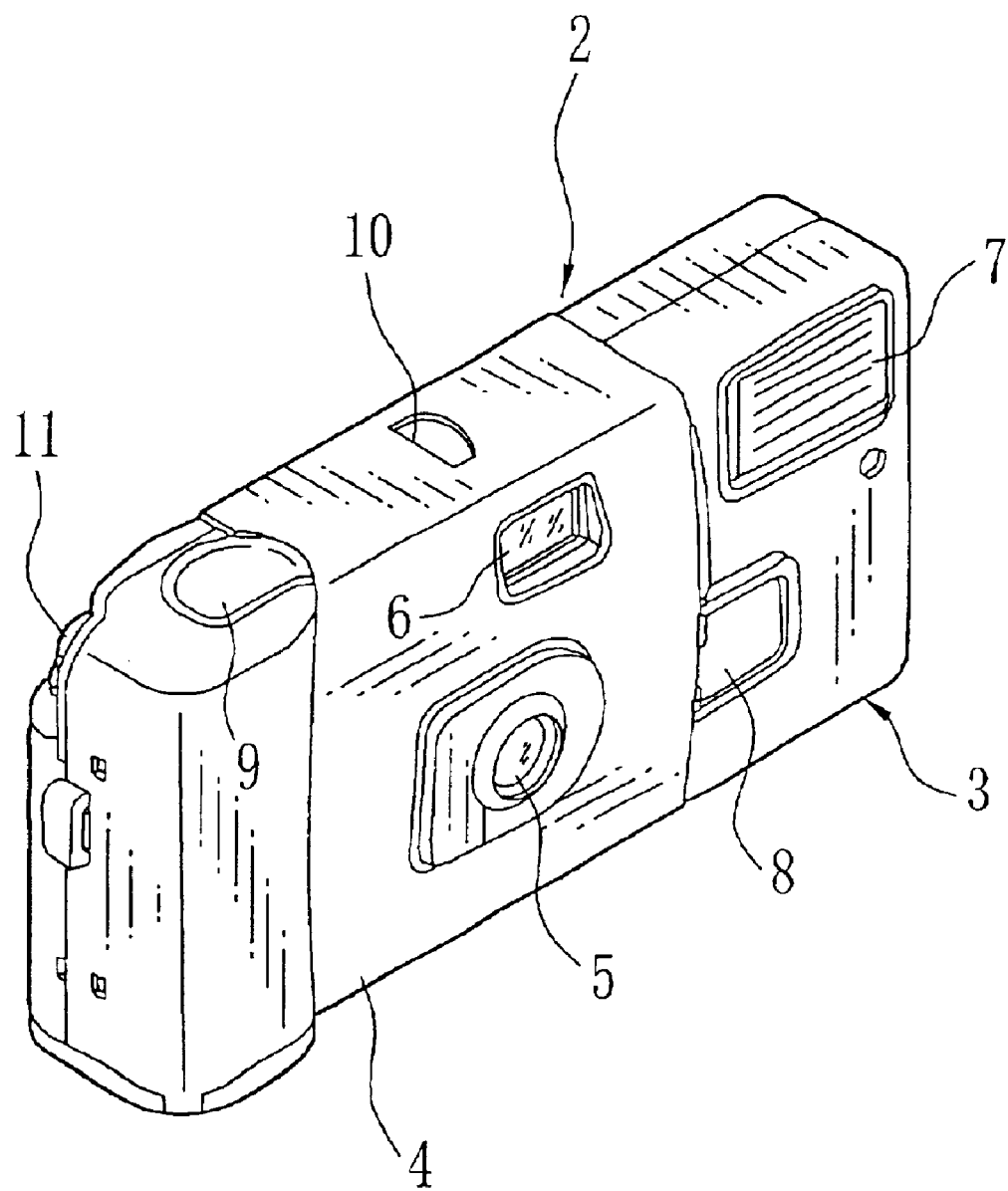
FIG. 1 shows an example of Film with Lens Unit which is to be recycled by using the present invention.

FIG. 1 shows an example of Film with Lens Unit which is to be recycled by using the present invention. Film with Lens Unit 2 includes a unit body 3 and an exterior sheet 4 partly covering outside of the unit body 3. A photographing lens 5, finder 6, flash window 7 and flash unit charging switch 8 are disposed in the front face of the Film with Lens Unit 2. A shutter release button 9 and a film frame counter window 10 are formed on the top surface. A film winding knob 11 is exposed on the rear corner of the unit body 3 slightly below the top surface.

Figure 2:
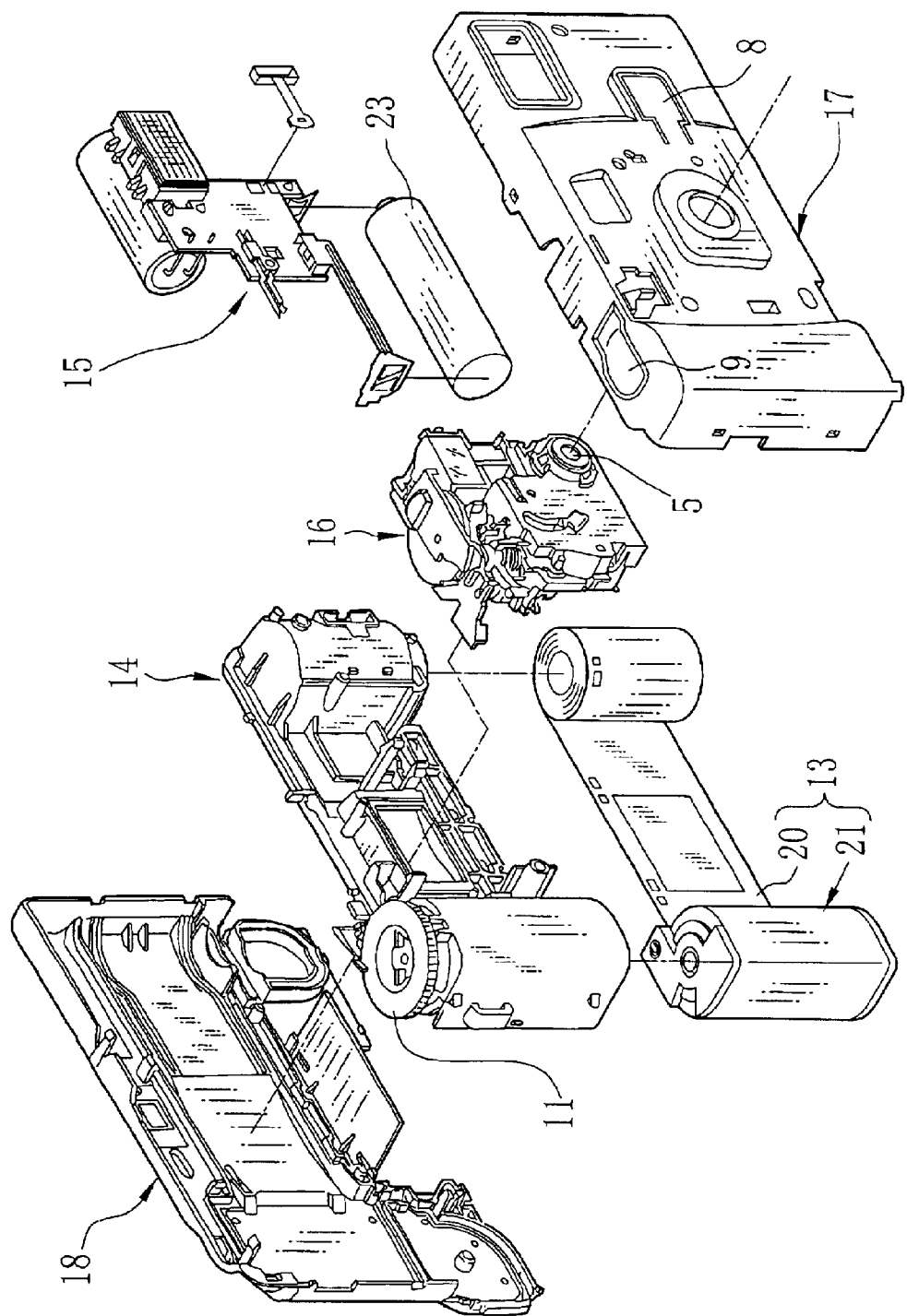
FIG. 2 is an exploded perspective view showing the structure of Film with Lens unit.

As shown in FIG. 2, the unit body 3 includes a unit base 14 where a film cartridge 13 is accommodated, a flash unit 15, an exposure unit 16 equipped with a photographic lens 5 and a shutter releasing mechanism, and a front cover 17 and a rear cover 18 which cover the unit base 14. Used-up Film with Lens unit 2 is collected for recycling via photo shops and/or processing laboratories after the loaded cartridge 21 with the exposed film 20 is taken out for developing and printing.

Figure 3:
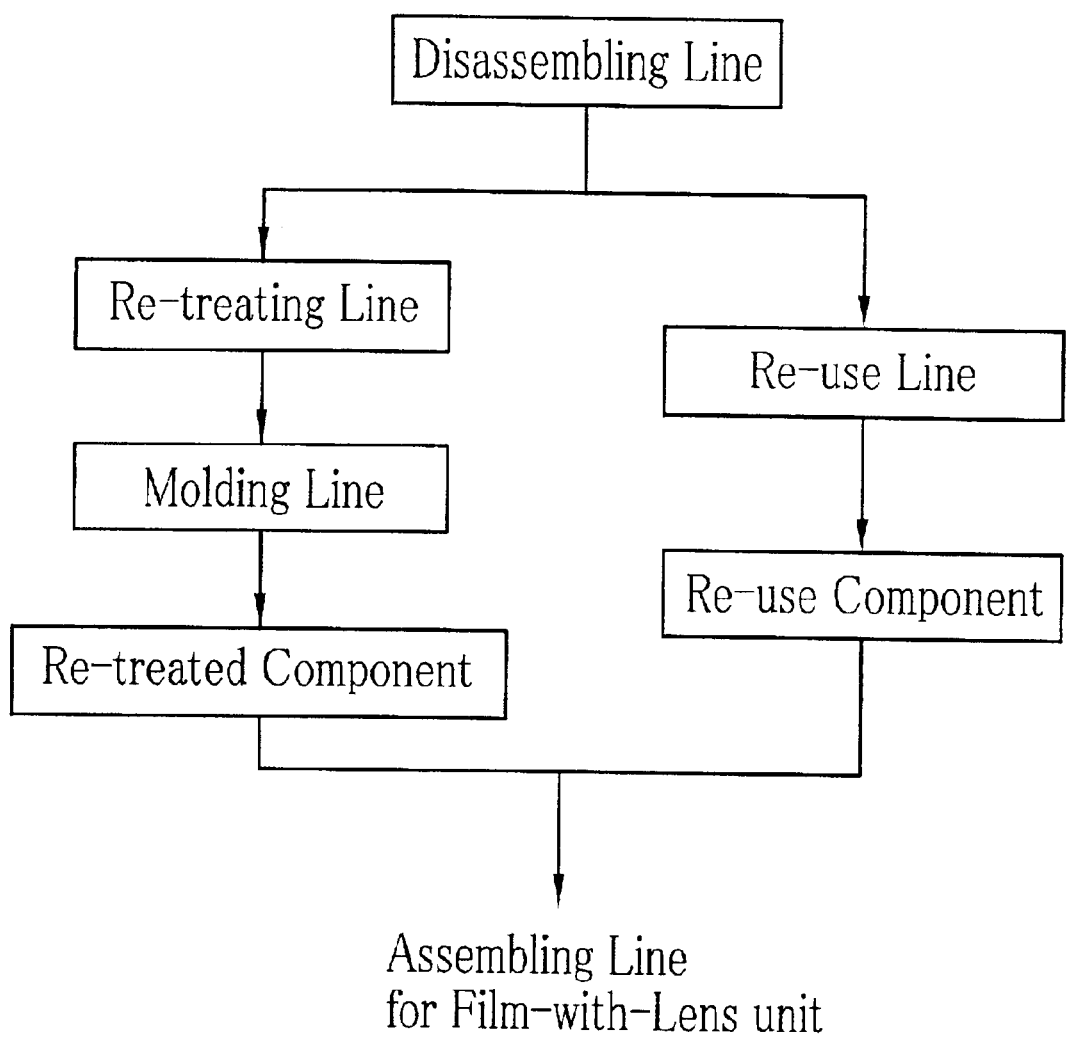
FIG. 3 shows block diagram of a recycling plant for the Film with Lens unit.

FIG. 3 shows block diagram of a recycling plant for the Film with Lens unit. The recycling plant consists of four process lines, i.e. disassembling line for disassembling collected used-up Film with Lens units, re-use line for reusing functional components such as flashing unit 15 or exposure (photographing) unit 16 by examining, cleaning and adjusting/repairing, if any, them, re-treating line (recycling in the narrow sense) for obtaining plastic raw material by processing thermoplastic components such as unit base 14, front cover 17 or rear cover 18 and molding line for re-molding a unit base 14, a front cover 17 and a rear cover 18.

Collected used-up products are separated according to the model and transported to respective disassembling lines where papers or labels 4 covering the outside are removed and a front cover 17 and a winding knob are taken out and transported to the re-treating line. Then an exposure unit 16 and a flashing unit 17 are removed from a unit base 14 to be transported to the re-use line where they are examined, cleaned and adjusted/repaired and a battery from the flashing unit is also checked on whether it can be available again for next use. The rest, the unit base 14 itself and a rear cover 18 are transported to the same re-treating line. Those plastic components are checked on whether they are accompanied with metallic stuffs before transferred to the re-treating line.

Figure 4:
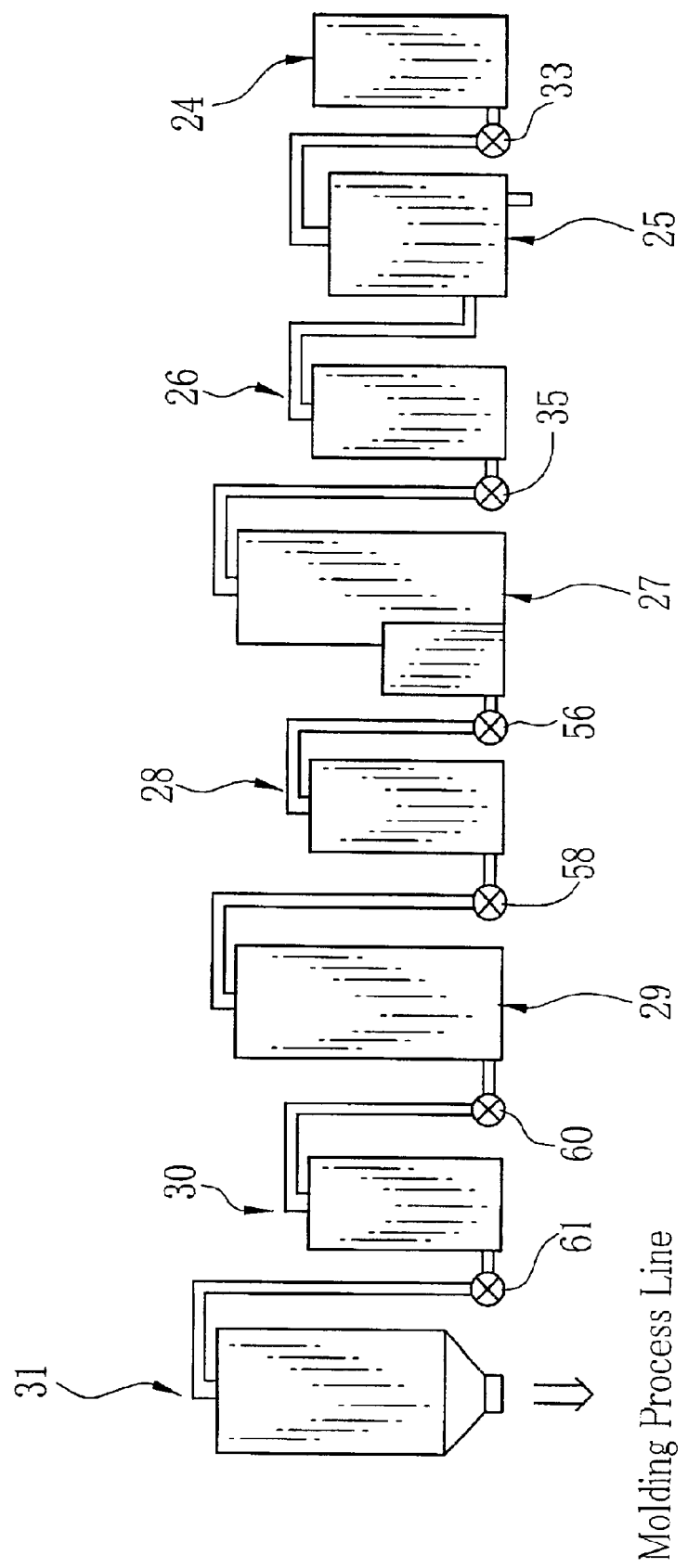
FIG. 4 shows schematic diagram illustrating the process flow of re-treating process line for plastic components.

FIG. 4 shows schematic diagram illustrating the process flow of the re-treating process line. The line includes a coarse crusher 24, an airflow separator 25, a fine crusher 26, a washer 27, a dewaterer 28 (for removing water from the crushed plastic), a dryer 29, metal detector 30 and a storage 31. The front cover 17, rear cover 18, the unit body 14 and the film winding knob 11 which are taken out from disassembled product are put first in the coarse crusher 24 having a screen with an appropriate mesh size, normally from φ 20 to φ 60 to obtain chips whose range of size is between 20 mm and 60 mm. The coarse-crushed plastics (chips) is transferred to an airflow separator 25 by a feeder such as an air loader hopper 33. Any other feeders capable of crushed plastic chips such as conveyor or pipe feeder are available. In the airflow separator 25, the crushed plastic chips are separated from other foreign matters such as pieces of label sheet, film and the like which has been left in previous processes, and transported to the fine crusher 26.

An airflow separator 25 separates things according to differences of their related gravity and the sizes (equivalent diameter). Therefore the plastics should not be crushed into very small pieces to have a good separation. For example, when the mesh of screen is ϕ 35, 93% by weight of plastic chips are obtained by the separation.

In the process of fine crushing, a screen of mesh size ϕ 4–ϕ 12 is used which produces appropriate size of chips (2 mm ×3 mm) for washing and molding in the following processes. In the example carried out, operation condition of fine crusher is determined so as to keep the weight ratio of fine crushed plastic chips with size smaller than 1 mm less than 10%. This condition is to reduce the loss of plastic material and to stabilize the molding process. The fine crushed plastic chips are transferred to a washer 27 by the loader hopper 35.

Usually collected used Film with Lens units are contaminated by a variety of materials such as oil and fat, sebum, foods, cosmetics and toiletries and others. Those should be cleaned, specially it is necessary to remove perfectly the materials harmful to photographic products. Generally, organic solvent, CFCs and other detergents are used as washing agents. However those cause the issues of environment load, running cost and waste water treatment cost. Other washings, such as by high-pressured water, blasting of sand, resin particles or dry-ice, ultra-sonic vibration, X-ray or ultraviolet ray, can be applied, but it is also not easy to have good washing with low cost and automatic system thereby.

Figure 5:
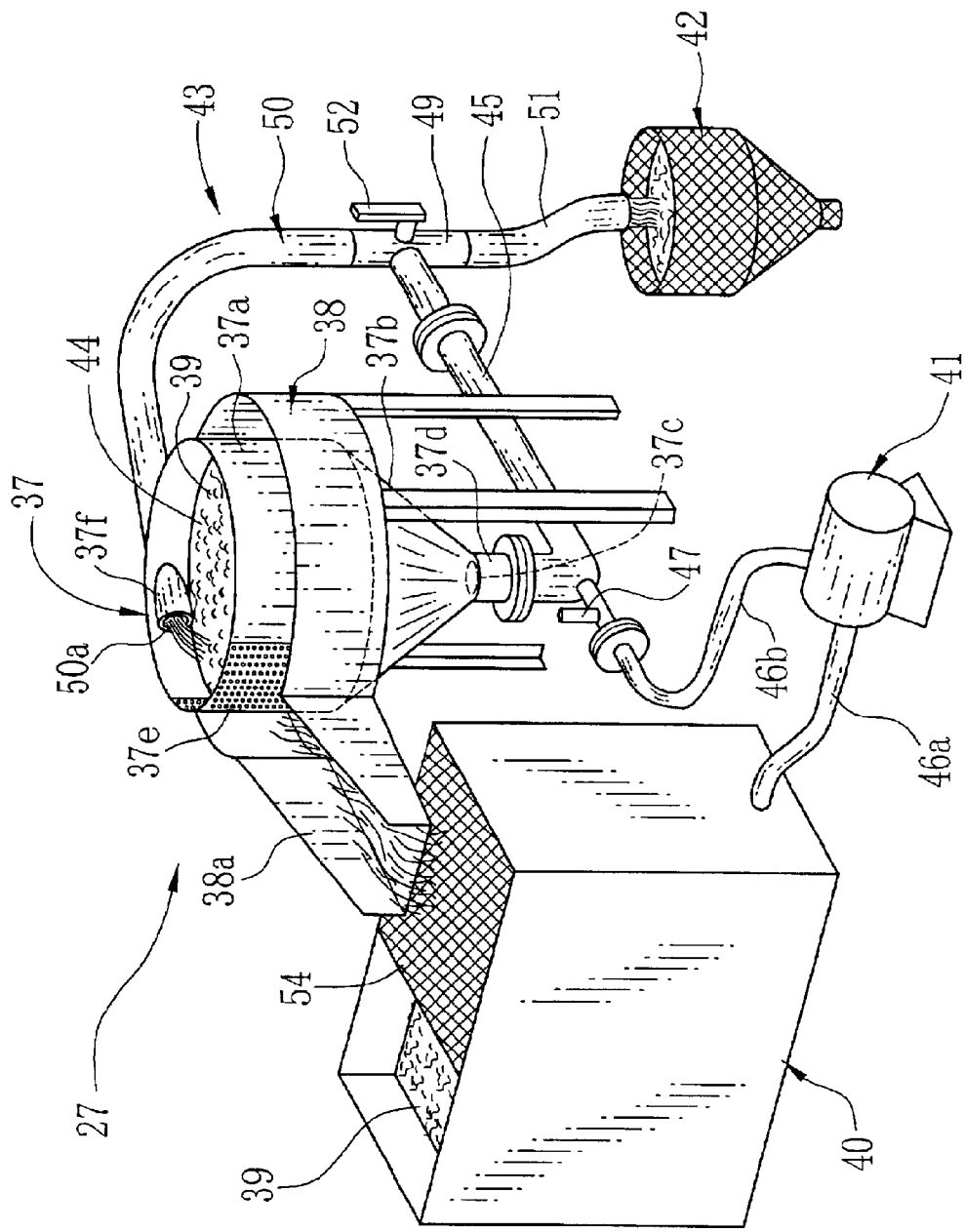
FIG. 5 show a perspective view of an essential part of a washer in a washing process of this invention
Figure 6:
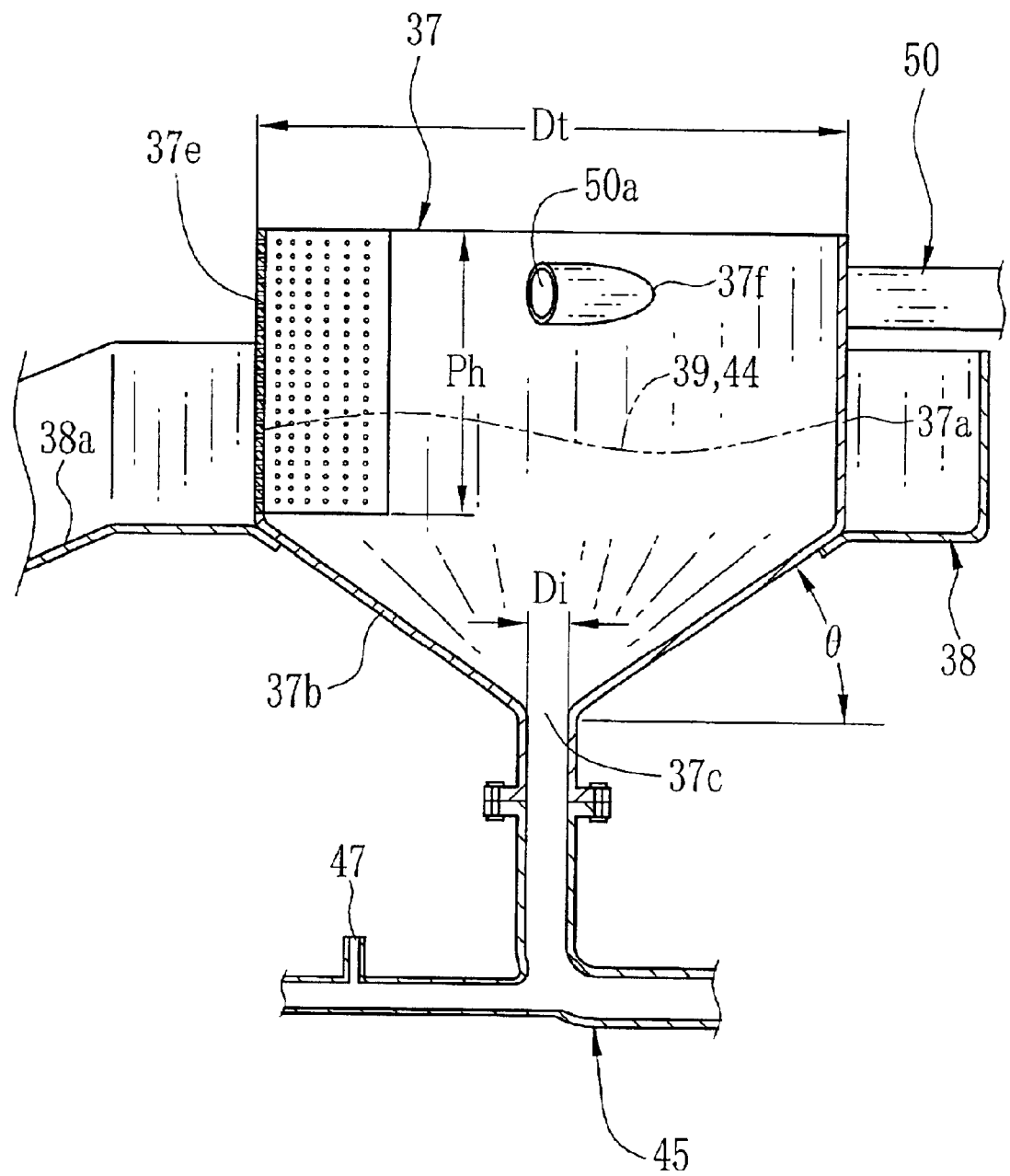
FIG. 6 shows a sectional view of an essential part of the washer.

FIG. 5 and FIG. 6 show a perspective view and a sectional view of essential parts of a washer 27 of this invention. The washer 27 comprises a washing tank 37, an overflow drain 38 surrounding the washing tank 37 to receive washing liquid 39 overflowed from the washing tank 37, a washing liquid reserving tank 40 for reserving the washing liquid 39 with heating, a washing liquid feeding pump 41 for feeding the washing liquid reserved in the hot washing liquid tank 40, circulating pipeline 43 for flowing back a mixture of the washing liquid 39 and the crushed plastic chips 44, and drainer basket 42. The washing tank 37 for receiving a mixture of crushed plastics of used-up plastic product and washing liquid is formed with a tubular shell portion 37a and a conical bottom portion 37b continued thereto. The conical bottom portion 37b has a sink hole 37c in the central area into which the mixture is to flow. A joint pipe 37d connects the circulation pipeline 43 to the sink hole 37c.

A mixture feeding pipe 45 which is a portion of the circulation pipeline 43 is connected to the joint pipe 37d at one end and connected to a branch pipe (T-shaped joint pipe) 49 at the other end. Both end of the branch pipe 49 are connected to circulation pipe 50 constituting a portion of the circulation pipeline 43 and a drain pipe 51 which is extended to a drainer basket 42. The circulation pipe 50 for discharging the mixture of crushed plastic chips of used-up plastic product and the washing liquid is extended through a hole 37f formed in the wall of the washing tank 37 and an outlet portion 50a at the end thereof is disposed close to and along the inner wall of the washing tank 37.

A switching valve with switching lever 52 is installed in the branch pipe 49 to be able to select flow path between the paths to the circulation pipe 50 and to the drain pipe 51.

The washing liquid tank 40 reserves washing liquid 39 which is heated. The washing liquid feeding pump 41 is connected to the washing liquid reserving tank 40 via an intake pipe 46a and connected to the mixture feeding pipe 45 via a discharging pipe 46b. A flow of washing liquid 39 caused by the pump discharging generates a reduced pressure in the mixture feeding pipe 45, which induces a flow of the mixture of crushed plastic chips and the washing liquid from the washing tank to the mixture feeding pipe 45. At an end of the discharging pipe 46b to which the mixture feeding pipe is connected, a nozzle is disposed in order to increase a flow speed of the washing liquid 39. The pump discharging pipe 46 has an air intake 47 in the middle thereof to mix bubbles in the washing liquid 39. The bubbles mixed with the washing liquid 39 increases washing power due to cavitation effect.

Discharged mixture of the crushed plastic chips 44 and the washing liquid 39 from the outlet 50a hits the inner wall of the washing tank 37. The tubular portion 37a of the washing tank 37 is disposed upper than the overflow drain 38 and has a punched plate portion 37e which is located in the position discharged mixture flow hits. The punched plate 37e has a great number of holes of approximate ϕ 1 mm in this embodiment which allows washing liquid containing a variety of contamination and foreign matters including plastic powder/particles and plastic chips of which sizes are less than ϕ 1 mm to be drained through the holes. The punched plate can be substituted with woven metallic wire. The proper size of punched hole depends on what size of plastic chips should be recovered. Larger size increases loss and smaller size increases clogging. However clogging may be avoided if the returned and discharged washing liquid hits the punched holes area with sufficient pressure.

The drained washing liquid through the punched holes is once received by the overflow drain 38 then run down a water-shoot 38a to return into the washing liquid reserving tank 40. A screen 54 is put on the washing liquid reserving tank 40 to screen the solid foreign matters such as plastic chips contained in the drained washing liquid. Therefore, the crushed chips after passing the punched holes do not flow in the washing liquid reserving tank 40.

Figure 7:
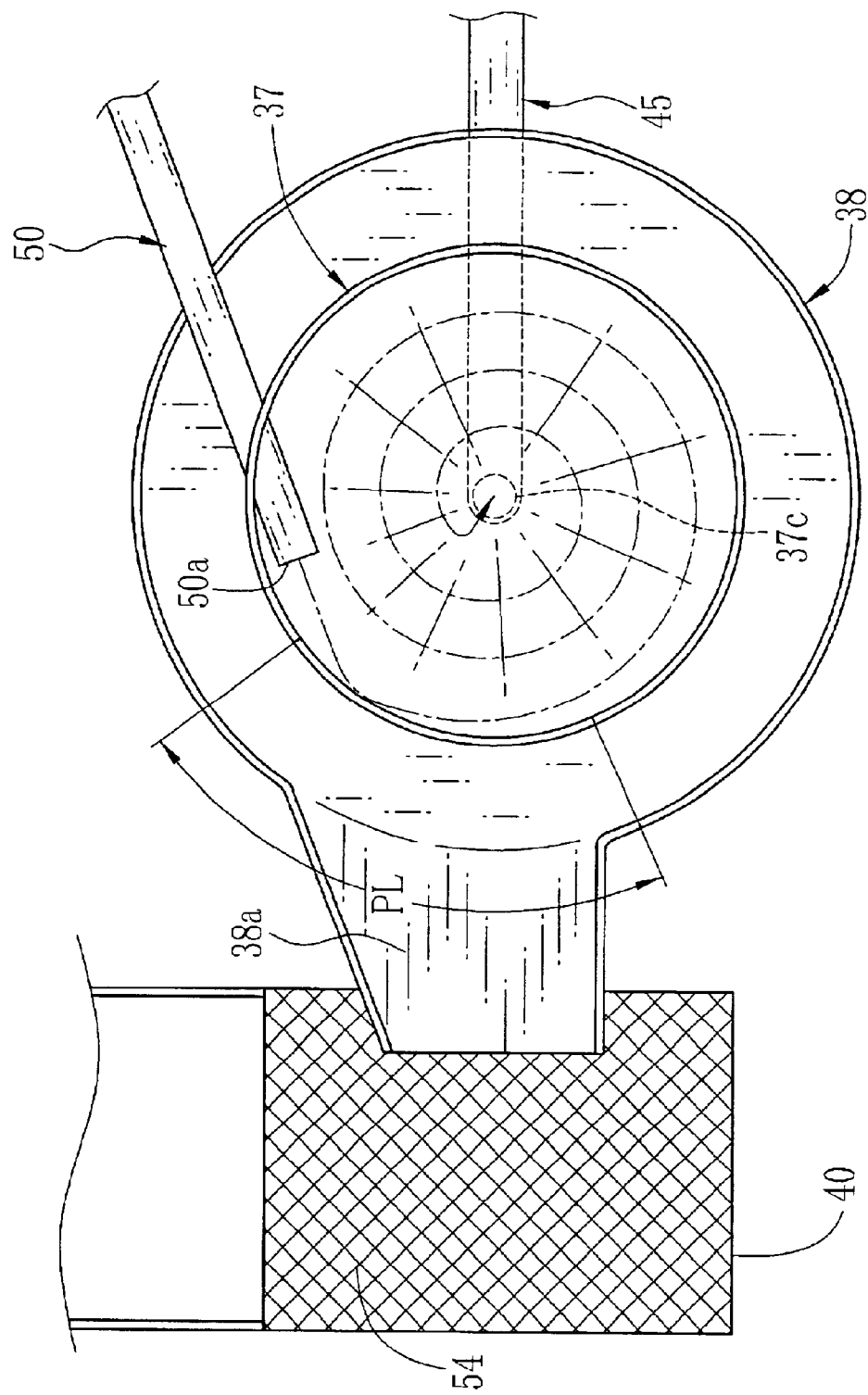
FIG. 7 shows a plan view of the washing tank.

As shown in FIG. 7 of plan view of the washer 27, returned mixture of the washing liquid 39 and the crushed plastic chips 44 makes a spiral flow, example counterclockwise, and drained in the sink hole 37c because of discharging velocity and tapered plane of the conical bottom 37b. Then the mixture is induced into the mixture feeding pipe 45, and flowed back through the circulation pipeline 43 with the fed washing liquid by the washing liquid feeding pump 41 to the washing tank 37.

While the crushed plastic chips 44 are repeatedly circulated through the washing tank 37 and the circulation pipe 50 by the washing liquid 39. Contamination or powdered plastics of the surface of the crushed chip are removed, which seems by grinding or scraping between the chips, or between chip and inner wall, particularly punched plate portion, or by cavitation effect of bubbles or washing liquid flow itself. Thus the invention gives a sufficient and excellent washing off effect without using organic solvent or CFCs or detergents, which leads to reducing environment load, running cost and waste water treatment cost.

Usually it is better that the sink hole 37c is not covered entirely by the mixture of the washing liquid 39 and the crushed plastic chips 44, i.e. the sink hole 37c is partially open to air to induce air together, in order to make suction of the mixture into the sink hole stable, which leads to forming a stable spiral flow of the mixture in the washing tank 37. The stable spiral flow results in increasing circulation efficiency and washing efficiency because it avoids any stagnant regions which does not contribute to the washing. To form a stable spiral flow in the washing tank, it seems to be essential to find proper flow rate of the mixture and the rate between the washing liquid amount and the crushed plastic chips amount to be returned into the washing tank 37. More efficiently, a baffle plate is fixed on the inner wall of the washing tank to branch a portion of the spiral flow, and directly drains in the sink hole 37c.

There are many factors to be considered for that purpose such as pumping pressure by the washing liquid feeding pump 41, pump feeding rate (controllable by a pumping pressure or control valve disposed in the circulation pipeline), position of outlet 50a, discharging flow rate of the mixture, collision angle and pressure against the punched plate portion 37e, diameter of holes and opening ratio of punched plate portion 37e.

Also degree of inclined bottom plane and property of washing liquid, such as viscosity or specific gravity, are to be considered depending on using liquid and washing apparatus. The degree of inclined bottom plane can be between 20° and 75° as long as a stable spiral flow is formed and kept. It is another way to improve circulation efficiency to fix a baffle plate on the inner wall of the washing tank to branch a portion of the spiral flow to drain directly into the sink hole 37c.

With respect to how to start washing process in the washer 27, there can be some ways. For example, the crushed plastic chips 44, which temporarily stored by predetermined in a hopper located above the washer 27, is fed first in the washing tank 37 and then feeding the washing liquid 39 to circulate by starting pump 41. This starting, however, can not provide sufficient washing because the crushed plastic chips tend to be separated from the washing liquid, i.e. not circulated well together with washing liquid and sometimes the plastic chips blocks the sink hole 37c while only the washing liquid is circulated. One of the reason seems that the plastic chips can not get wet because of hydrophobic property of the plastics and/or hydrophobic contamination by molding lubricant. To avoid this problem, the washing tank should be filled once with the washing liquid to soak the plastic chips in the washing liquid, then the washing liquid feeding pump should be started after predetermined time of soaking. Another way is; first making a stable circulation of washing liquid, then throwing-in the plastic chips from the hopper. As one of example of this way, 200 liter of hot water at temperature of 60° C. was added to the washing tank 37, and then the washing liquid feeding pump 41 is actuated. While the hot water is circulating, 20 Kg of the plastic chips was thrown in the washing tank so as to get in the spiral flow. This way made a good circulation flow of mixture.

After a predetermined number of circulation is made or predetermined time has passed, i.e. the crushed plastic chips is fully washed, flow path is switched to drainpipe 51 by operating the switching lever 52 to drain the mixture into the drainer basket 42. The drainer basket 42 is made of wire-screen or punched plate, which separates the plastic chips 44 from the washing liquid 39. In the case where specific gravity of the crushed plastic chips is smaller than that of washing liquid, the chips tend to stay on the surface of the washing liquid in use of usual stirred tank, which leads to insufficient washing. Washing by this invention can avoid that problem because the spiral flow and circulation through outside pipeline can prevent the chips and the washing liquid from separating each other.

Washed and cleaned plastic chips accumulated in the drainer basket 42 are transported to a dewaterer 28 by a conveyer or pipe feeder 56. The dewaterer 28 is a centrifugal separator type or spin-dryer type, which can remove water from the chips, for example, by 98% or more. Instead of the loader hoppers 35, 58, 60 and 61, others may be uses, as far as they are effective for conveying, such as a pneumatic transportation or suctioning transportation pipeline.

Dewatered plastic chips are transferred to a dryer 29 by a loader hopper 58. Usually the dryer 29 is hot air blowing type dryer. Other types of dryer such as steamheater, electric heater, microwave and light-heating are also available. Dried plastic chips are transported to a metal detector 30 by a loader hopper 60. The metal detector 30 detects metal pieces mingled in the chips by using eddy current and separates them. After metal pieces separation, the plastic chips is transferred and piled up by a loader hopper 61 in a storage 31. To increase the separation efficiency, it is preferable to make preliminary separation of iron materials by magnet prior to the metal detection by the metal detector 30. The magnet can be disposed at other places than metal detector section for further increase of metal removal efficiency.

Figure 8:
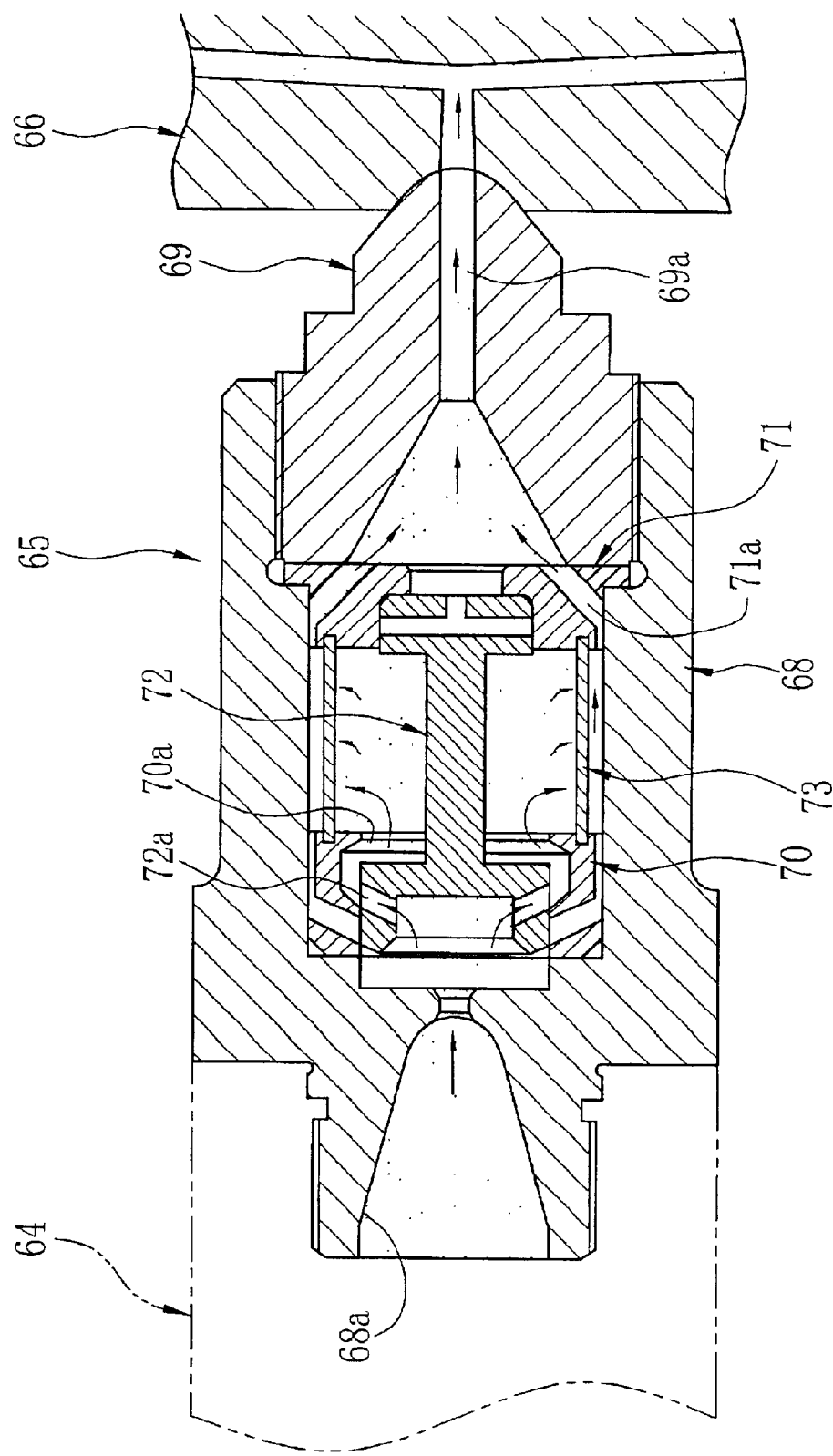
FIG. 8 shows a sectional view of an essential part of a nozzle attached to injection molding machine in injection operation state.

Plastic chips in the storage are conveyed to a molding process line where plastic components of Film with Lens unit such as a front cover 17, a rear cover 18, a unit base 14 and a film winding knob 11 are manufactured by injection molding. As shown in FIG. 8, nozzle 65 to make molten plastic run into a die 66 is mounted on an injection molding machine 64. The nozzle 65 includes a nozzle case 68 which is fixed to the injection molding machine 64, a nozzle head 69 secured to the top of the nozzle case 68 pressed against the die 66, first cap 70 and second cap 71 fitted inside the nozzle case 68, a shifting shaft 72 to shift molten plastic flow path and a filter 73.

Figure 9:
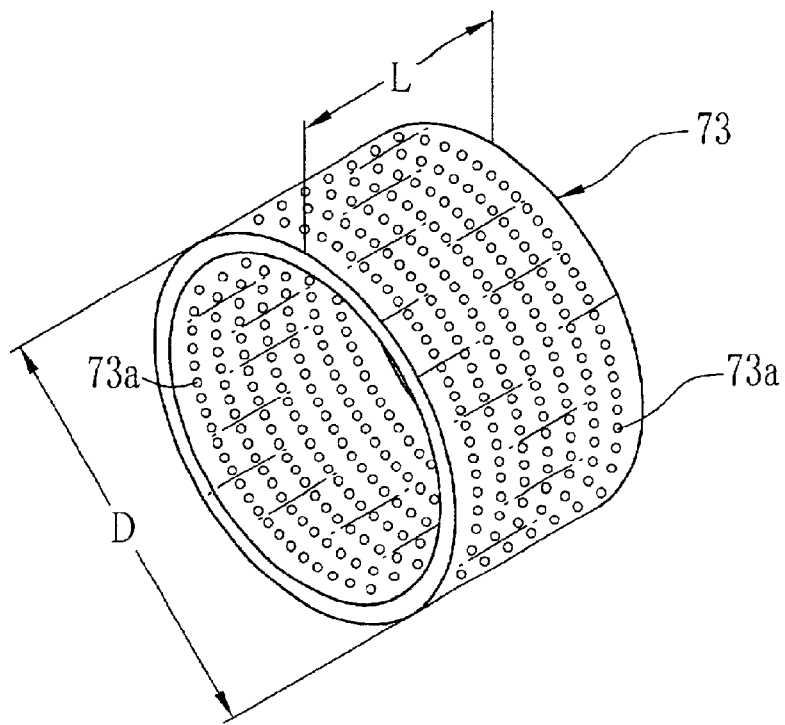
FIG. 9 is a perspective view of a filter installed in the nozzle.

FIG. 9 shows the filter 73 that is cylindrical shell with numerous small holes 73a. The filter 73 is made of high-strength steel of about 2 mm thickness to withstand the maximum cylinder pressure of the injection molding machine 64. Diameter of the small hole 73a is $\phi$ 0.2 mm, thickness/diameter ratio is about 10, which is developed based on the mesh filter of #200 used in the conventional pelletizing extruder. Pitch of small holes is 0.5 mm which is almost limit value to be able to form small holes. External diameter of the filter is $\phi$ 45 mm and the longitudinal length is 30 mm and the opening ratio is 11%. Therefore the total number of the small holes becomes 15,414 and total sectional area of the holes is equivalent to that of hole of $\phi$ 24.8 mm, which is larger than the sectional area of molten plastic flow path in the ordinary injection molding machines or dies. Thus the pressure loss for the filter 73 seems tolerable even if flow resistance is taken into account.

Figure 10:
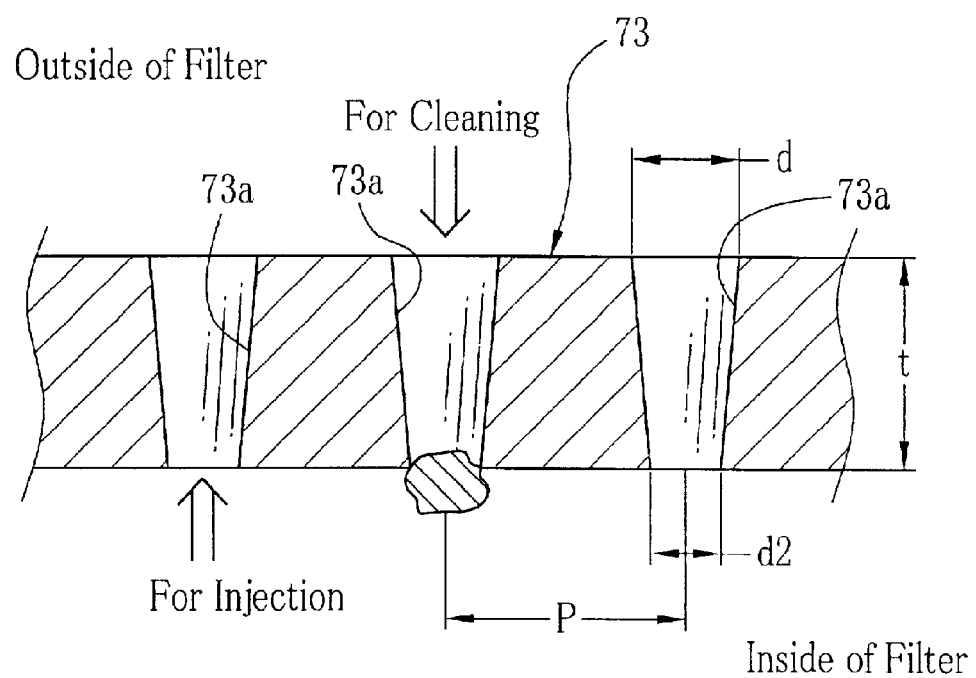
FIG. 10 is a sectional view of an essential part of the filter.

As for forming the small holes, it is difficult to form them by drilling in view of the diameter, pitch, the number of holes, thickness and shape of the filter, working accuracy, working time and cost. Seemingly laser processing is applicable, but in fact it takes time to make hole, which causes thermal deformation of other holes in the neighborhood. It is found that electron beam processing with small spot capable of providing a large energy in a moment is best for the purpose, which also make it easy to form a tapered hole only by adjusting the processing conditions. As shown in FIG. 10, hole 73a is a tapered one with larger diameter(d) on the outer surface of the filter 73 and smaller one (d2) on the inner surface. The gradient of the hole is 20 degrees.

The plastic chips 44 transported to the molding line are fed into a heated cylinder of the injection molding machine 64 where they are molten by a heater and a heat from a shear generated by an extruding screw in the cylinder. At injection molding, the injection molding machine 64 injects the molten plastic in a nozzle port 68a formed in the rear portion of the nozzle case 68. The pressure of the molten plastic thrusts a shifting shaft 72 to move in the direction for a nozzle head 69, the movement forms a first connecting path 72a connected to a central path 70a of the first cap 70. The molten plastic passes through the first cap 70, then small holes 73a of the filter 73 from inside to outside. At the filter, foreign matters mingled in the molten plastic are filtered off and stay inside of the filter 73.

Figure 11:
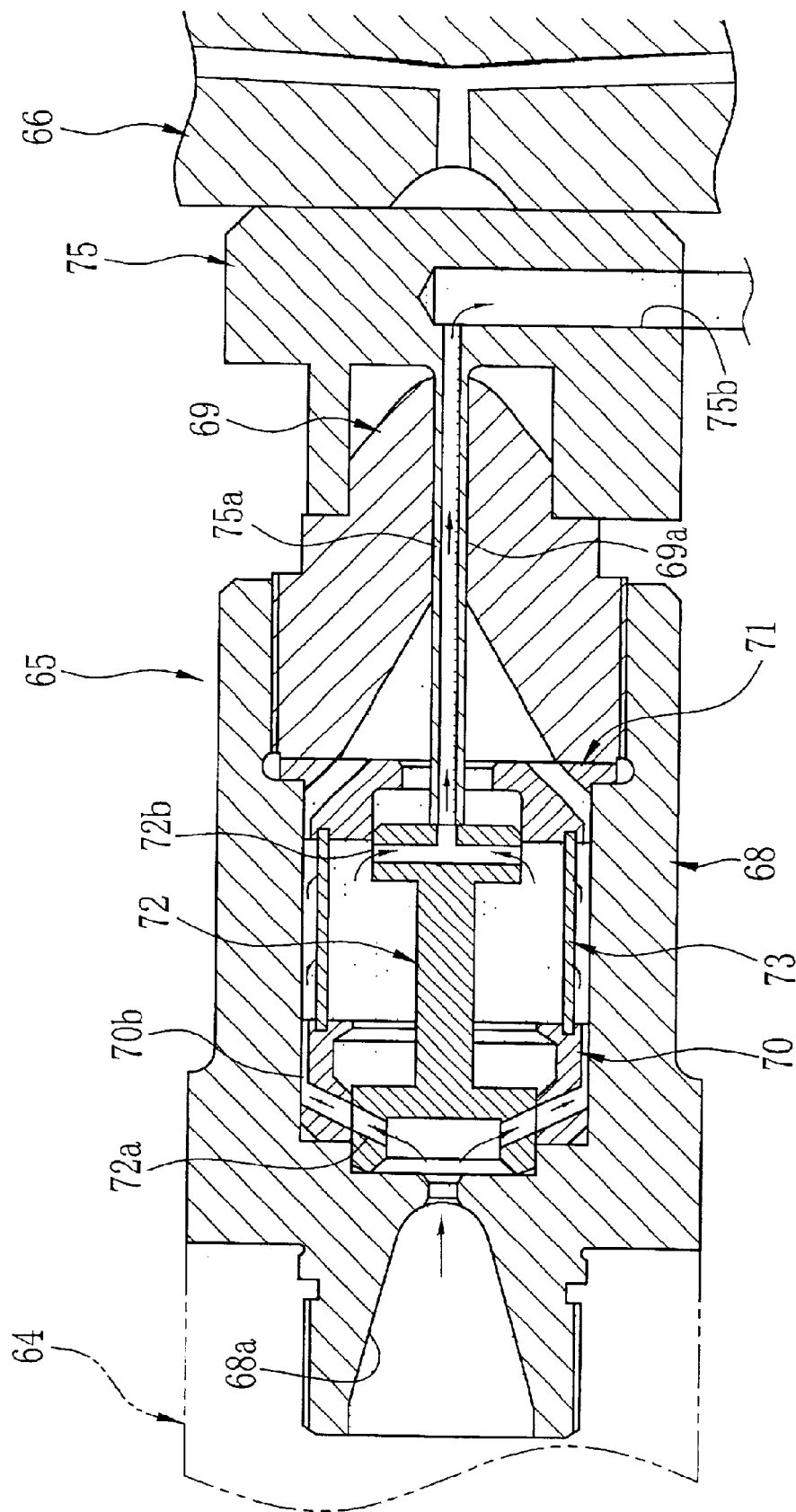
FIG. 11 shows a sectional view of an essential part of a nozzle attached to injection molding machine in cleaning operation state.

The filtered molten plastic flows in a nozzle head 69 via peripheral path 71a formed in the outer region of the second cap 71, then is injected into a die 66 via a nozzle path 69a. When the pressure loss of filter increases by clogging, removing the clogging can be made without disassembling the nozzle 65 by cleaning the filter 73. As shown in FIG. 11, a cleaning nozzle 75a of a cleaning plunger 75 is inserted in the nozzle path 69a of the nozzle head 69 and the cleaning plunger 75 is thrust against the die 66. End edge of the cleaning nozzle 75a presses the shifting shaft 72 to move back toward the body of molding machine. Slide movement of the shifting shaft 72 toward the machine body makes the first connecting path 72a connected to a peripheral path 70b formed in the outer region of the first cap 70. In this condition, when the injection molding machine 64 makes a molten plastic run into the nozzle part, the molten plastic flows into the outside area of the filter 73 via the peripheral path 70b outside the first cap 70, and then runs through the small holes 73a of the filter 73 into the inside area thereof removing the clogging matter from the filter. Then the molten plastic is drained from a cleaning drain 75b via a second connecting path 72b formed in the shifting shaft and the cleaning nozzle 75a of the cleaning plunger 75. Thus cleaning the filter can be made without disassembling the nozzle 65 and by simply setting the cleaning plunger 75, which reduces the time for cleaning the nozzle and dangerous and troublesome job to handle the high-temperature machine parts. The smaller the hole diameter of the filter becomes, the more the filter can remove the foreign matter, however which causes increase of pressure loss, difficulty in manufacturing and high cost. Another type of filters such as one manufactured by welding, sintering or pressing plural metallic wire net, sintered metal, porous ceramics or metal screen can be applicable.

The effect of above apparatus will be described. The lens-fitted photo film unit 2 illustrated in FIGS. 1 and 2 is withdrawn after use and sent to a recycle plant illustrated in FIG. 3. In the recycle plant, the lens-fitted photo film unit 2 is sorted into each types and provided for the respective disassembling line.

Collected used-up products are separated according to the model and transported to respective disassembling lines where papers or labels 4 covering the outside are removed and a front cover 17 and a winding knob are taken out and transported to the re-treating line. Then an exposure unit 16 and a flashing unit 17 are removed from a unit base 14 to be transported to the re-use line where they are examined, cleaned and adjusted/repaired and a battery 23 from the flashing unit is also checked on whether it can be available again for next use.

The rest, the unit base 14 itself and a rear cover 18 are transported to the same re-treating line. Those plastic components are checked on whether they are accompanied with metallic stuffs before transferred to the re-treating line.

The front cover 17, rear cover 18, the unit body 14 and the film winding knob 11 which are transported in the re-treating process line illustrated in FIG. 4 are put first in the coarse crusher 24 having a screen with an appropriate mesh size, normally from φ 20 to φ 60 to obtain chips whose range of size is between 20 mm and 60 mm.

The coarse-crushed plastics (chips) is transferred to an airflow separator 25 by a feeder such as an air loader hopper 33. Any other feeders capable of crushed plastic chips such as conveyor or pipe feeder are available. In the airflow separator 25, the crushed plastic chips are separated from other foreign matters such as pieces of label sheet, film and the like which has been left in previous processes, and transported to the fine crusher 26.

In the process of fine crushing, the crushed plastics are further crushed into the sizes of φ 4–φ12, which are adequate for cleaning and molding. The fine crushed plastic chips 44 are transferred to a washer 27 by the loader hopper 35 and contained with an predetermined amount in a determining hopper disposed in the upside of the washer 27.

In the washer 27, the washing liquid 39 is supplied in the washing tank 37 and heated to the 60° C., and the washing liquid feeding pump 41 is actuated. Then, while the washing liquid 39 are circulated between the washing tank and the circulation pipeline 43, the bottom bulb of the determining hopper is opened to supply 20 Kg of the crushed plastics in the washing tank 37. Thus, the washing liquid 39 and the crushed plastics are easily mixed to form the stable spiral flow.

The washing liquid 39 may be circulated after supplying the crushed plastics 44 in the washing tank 37. However, the plastic tends to repel water, and the surface thereof is coated with a die lubricant. Therefore, the washing liquid 39 and the crushed plastic 44 are hardly mixed such that the crushed plastic does not flow and stops the sink hole 37c, which prevents forming the stable spiral flow. Accordingly, after supplying the crushed plastics 44, the washing tank 37 is preferably filled with the washing water and after a predetermined interval to dip the plastics in the washing water, the washing liquid feeding pump 41 is actuated.

A flow of washing liquid caused by the washing liquid feeding pump 41 generates a reduced pressure in the mixture feeding pipe 45, which induces a flow of the mixture of crushed plastic chips and the washing liquid from the washing tank to the mixture feeding pipe 45. The crushed plastics in the mixture feeding pipe 45 are sent through the branch pipe 49 to the circulation pipe 50 and spouts out from the outlet portion 50a in the washing tank 37.

The pump discharging pipe 46b has an air intake 47 in the middle thereof to mix bubbles in the washing liquid 39. The bubbles mixed with the washing liquid 39 increases washing power due to cavitation effect.

Discharged mixture of the crushed plastic chips 44 and the washing liquid 39 from the outlet 50a hits the inner wall of the washing tank 37. The crushed plastic chips 44 makes a spiral flow in a counterclockwise direction, and drained in the sink hole 37c because of discharging velocity and tapered plane of the conical bottom 37b. Then the mixture is induced into the mixture feeding pipe 45 and flowed back through the circulation pipeline 43 with the fed washing liquid by the washing liquid feeding pump 41 to the washing tank 37.

While the crushed plastic chips 44 are repeatedly circulated through the washing tank 37 and the circulation pipe 50 by the washing liquid 39. Contamination or powdered plastics of the surface of the crushed chip are removed, which seems by grinding or scraping between the chips, or between chip and inner wall, particularly punched plate portion, or by cavitation effect of bubbles or washing liquid flow itself.

The plastic chips and particles of the smaller size than the predetermined one, and polluted washing liquid 39 are discharged through the punched plate portion 37e out of the washing tank 37. The discharged washing liquid is received by the overflow drain 38, and flows thereafter in the watershoot 38a to the hot washing liquid tank 40. The small plastic chips and particles are filtrated by the screen 54 to contain only the washing liquid 39 in the hot washing liquid tank 40.

After a predetermined number of circulation is made or predetermined time has passed, i.e. the crushed plastic chips are fully washed, flow path is switched to drain pipe 51 by operating the switching lever 52 to drain the mixture into the drainer basket 42. The drainer basket 42 is made of wirescreen or punched plate, which separates the plastic chips 44 from the washing liquid 39.

If the crushed plastic has a smaller specific gravity than the washing liquid, it will float upward in the washing liquid at normal circulation, namely, has a bad dispersibility to the washing liquid, which makes the washing power less effective. However, in the present invention, the crushed plastic 44 is supplied for the circulation pipe one by one in the spiral flow, which does not cause the separation from the washing liquid. Therefore, the crushed plastics are washed effectively.

Washed and cleaned plastic chips accumulated in the drainer basket 42 are transported to a dewaterer 28 by a conveyer or pipe feeder 56. The dewaterer 28 is a centrifugal separator type or spin-dryer type, which can remove water from the chips, for example, by 98% or more. Dewatered plastic chips are transferred to a dryer 29 by a loader hopper 58. Usually the dryer 29 is hot air blowing type dryer.

Dried plastic chips are transported to a metal detector 30 by a loader hopper 60. The metal detector 30 detects metal pieces mingled in the chips by using eddy current and separates them. After metal pieces separation, the plastic chips is transferred and piled up by a loader hopper 61 in a storage 31.

Plastic chips in the storage are conveyed to a molding process line. The crushed plastic 44 is provided in a heat cylinder of the injection molding machine 64, which is disposed in the injection line, and are molten by a heater and a heat from a shear generated by an extruding screw in the cylinder.

The injection molding machine 64 injects the molten plastic in a nozzle port 68a formed in the rear portion of the nozzle case 68. The pressure of the molten plastic thrusts a shifting shaft 72 to move in the direction for a nozzle head 69, the movement forms a first connecting path 72a connected to a central path 70a of the first cap 70. The molten plastic passes through the first cap 70, then small holes 73a of the filter 73 from inside to outside. At the filter, foreign matters mingled in the molten plastic are filtered off and stay inside of the filter 73.

The filtered molten plastic flows in a nozzle head 69 via peripheral path 71a formed in the outer region of the second cap 71, then is injected into a die 66 via a nozzle path 69a. Further, the front cover 17, the rear cover 18, the main unit 14, the film winding knob 11 and the like are formed.

When the pressure loss of filter increases by clogging, n removing the clogging can be made without disassembling the nozzle 65 by cleaning the filter 73. As shown in FIG. 11, a cleaning nozzle 75a of a cleaning plunger 75 is inserted in the nozzle path 69a of the nozzle head 69 and the cleaning plunger 75 is thrust against the die 66. End edge of the cleaning nozzle 75a presses the shifting shaft 72 to move back toward the body of molding machine.

Slide movement of the shifting shaft 72 toward the machine body makes the first connecting path 72a connected to a peripheral path 70b formed in the outer region of the first cap 70. In this condition, when the injection molding machine 64 makes a molten plastic run into the nozzle part, the molten plastic flows into the outside area of the filter 73 via the peripheral path 70b outside the first cap 70, and then runs through the small holes 73a of the filter 73 into the inside area thereof removing the clogging matter from the filter. Then the molten plastic is drained from a cleaning drain 75b via a second connecting path 72b formed in the shifting shaft and the cleaning nozzle 75a of the cleaning plunger 75.

The invention above explained can reduce the energy consumption by 40% compared to conventional plastic recycling requiring pelletizing and by 10% compared to the case using a virgin plastics. And yet the invention does not need to use organic solvent, CFCs and detergents, which reduces environment load and waste water treatment cost.

EXAMPLE

Size of crushed plastic chips is important factor to operate a stable molding process by using crushed plastic chips. Too small size chips or too large one causes the following problem.

In the case of large size:

Blocking or clogging is caused in the processing line specially in the washing process and transportation or feeding line. Crushed chips consists of a variety of shapes which tends to be easily aggregated or blocked. Filling factor of crushed plastic chips in the molding machine is low. Piled-up and pressed crushed chips still forms a plenty of dead space, which reduces the amount filled in the molding machine. Dewatering may not be perfected because they often have recesses, holes, gutter, pouches and the like which remains undestroyed.

In the case of small size:

Loss of plastic materials increases. Too small size of plastic chips tend to be drain away with a washing liquid. Molding process may become unstable because the sizes varied widely, which varies melting rate depending on the chips. In the air transportation, the too small chips tend to stay in stagnant region.

Figure 12:
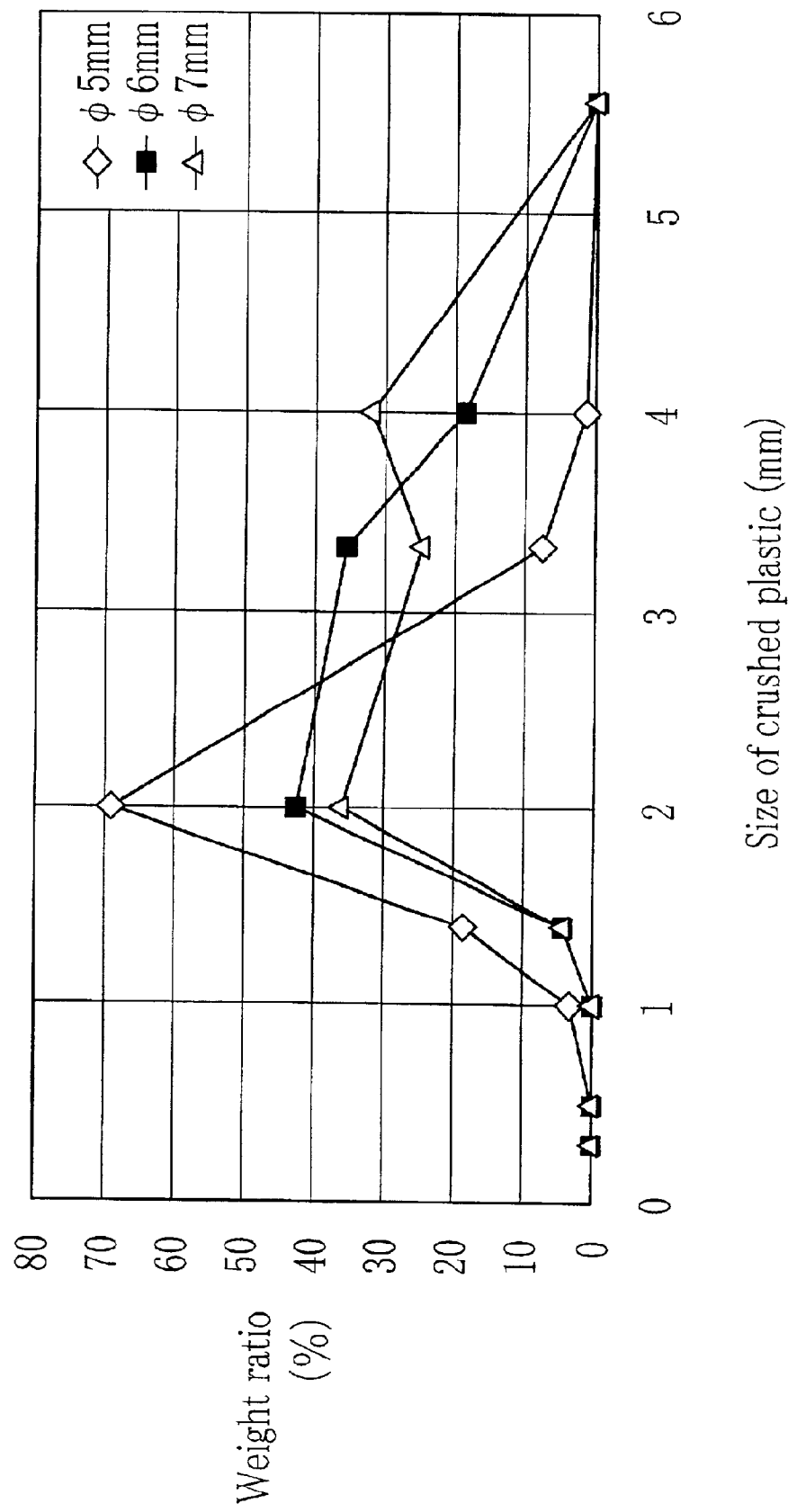
FIG. 12 is a graph showing distribution of obtained sizes of crushed plastics according to mesh size of screens used in fine crushing process with Film with Lens unit.

Size of crushed chips, about 2 mm×3 mm, seems to be proper size for a stable molding. To obtain the size of that value, proper mesh of screen used in fine crushing process should be selected. FIG. 12 is a graph showing distribution of obtained sizes according to mesh size of screens used in fine crushing process with Film with Lens unit. Selected meshes were φ 5 mm, φ 6 mm and φ 7 mm. FIG. 12 indicates that φ 5 mm mesh increases chips having side of length less than 2 mm, specially less than 1 mm compared to other mesh size which would probably be drained away as wastes in the washing process and φ 7 mm increases ones having side of length more than 5 mm. In comparison with those, φ 6 mm gives more chips of which side has length between 2 mm and 4 mm. Thus φ 6 mm of mesh is found to be best size for the molding without pelletizing.

Figure 13:
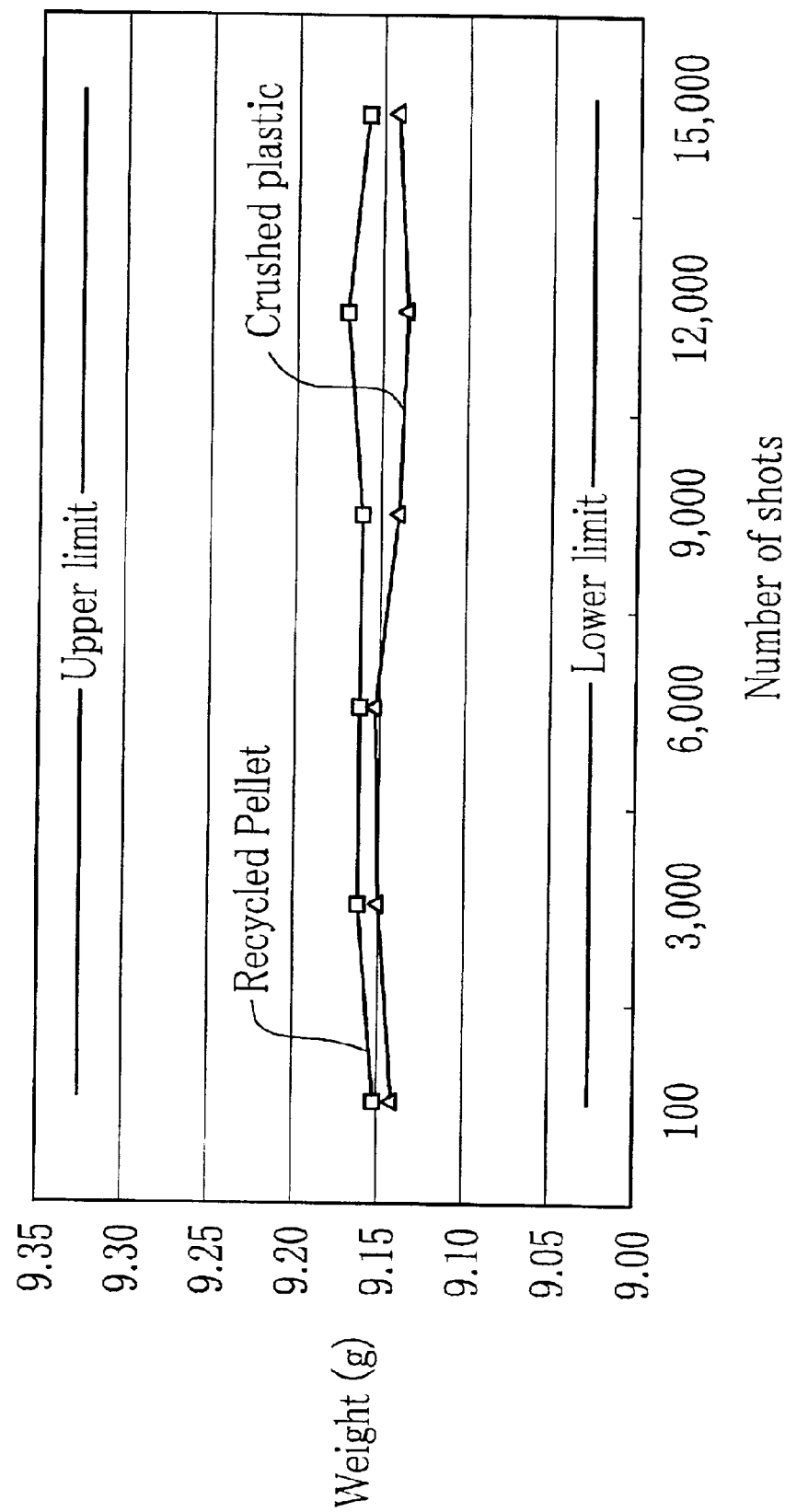
FIG. 13 is a graph showing weight variation of actually molded component (unit base)as the number of shots for molding increases.

FIG. 13 is a graph showing weight variation of actually molded component (unit base)as the number of shots for molding increases. In the test run of FIG. 13, the chips are ones fine-crushed using φ 6 mm mesh screen. Comparison example which used recycled (retreated) pellet is also shown.

Graph of FIG. 13 indicates that the molded products (unit base component)keeps fairly constant weight as the number of injection molding shots increases, which position between upper limit and lower limit for standard products and is by no means inferior to ones molded by using recycled (retreated)pellet.

Test for checking the degree of cleanliness of washed plastic chips was made under the following conditions.

Figure 14:
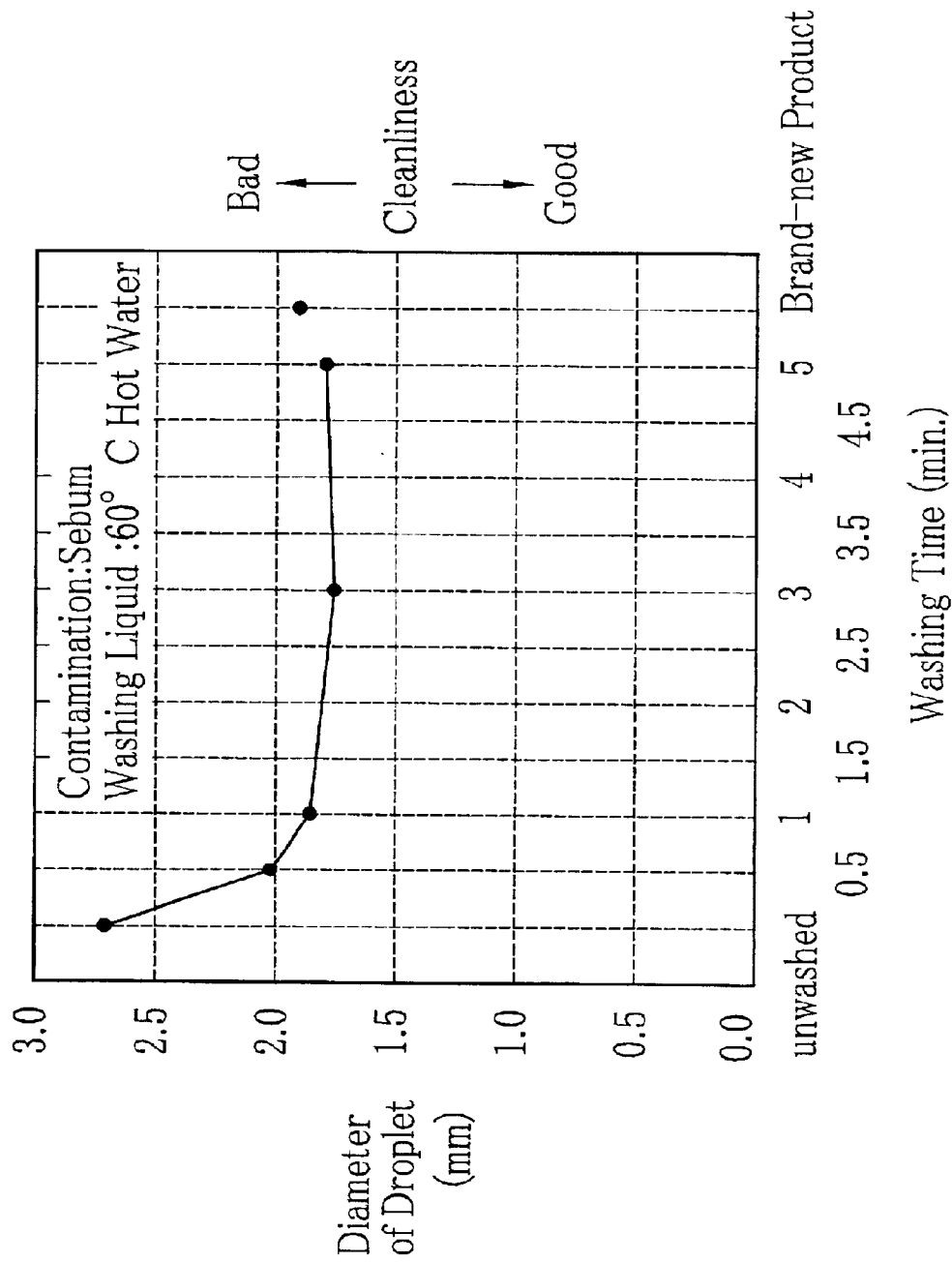
FIG. 14 is a graph showing relation between cleanliness of washed crushed chips and washing time.

Conditions for the test:
Diameter of washing tank, Dt: ϕ 800 mm
Degree of slope of conical bottom of washing tank è: 35°
Dimensions of punched plate portion:
  width (arcuate portion); 1600 mm
  height; 400 mm
  diameter of punched hole; ϕ 1 mm
  opening ratio; approximate 14%
Diameter of sink hole and circulation pipe: ϕ 40 mm
Pump pressure: 3.6 Kg/cm2
Pump discharging amount: 350 L/min.
Circulation rate: 20 times/min.
Washing liquid: hot water at 60° C.
Washed materials:
Kind of plastic: carbon-contained PS resin
Specific gravity: 1.05
Washed amount: 20 Kg
Kind of contamination: sebum FIG. 14 is a graph showing relation between cleanliness of washed crushed chips and washing time. Evaluation of cleanliness is made by water-drop method. In water-drop method, predetermined small amount of pure water droplet is dropped onto the test sample, then diameter of the droplet is measured. The cleaner the surface is, the smaller the diameter is, vice versa.

In the graph, diameter of droplet on the unwashed (before-washed) sample is about 2.7 mm, which is clearly contaminated judging by the fact that diameter on brand-new product (front cover) is 1.9 mm. Same testing sample as unwashed one was started to wash. Picked-up sample after 0.5 minute washing shows diameter of 2.05 mm which is almost the same as brand-new one. This shows 10 times of circulation gives the same cleanliness as the brand-new one because the circulation rate of the washing condition is 20 times circulation per minute. Picked-up sample after 3-minute washing shows 1.75 mm in diameter which implies the tested sample chip is cleaner than brand-new one. Thus the invented washing can remove oil and fat contamination without using organic solvents or detergents and does not take long. The reason washed sample gives clearer surface than brand-new one is because washing can remove the molding lubricant which remains on the brand-new.

Figure 15:
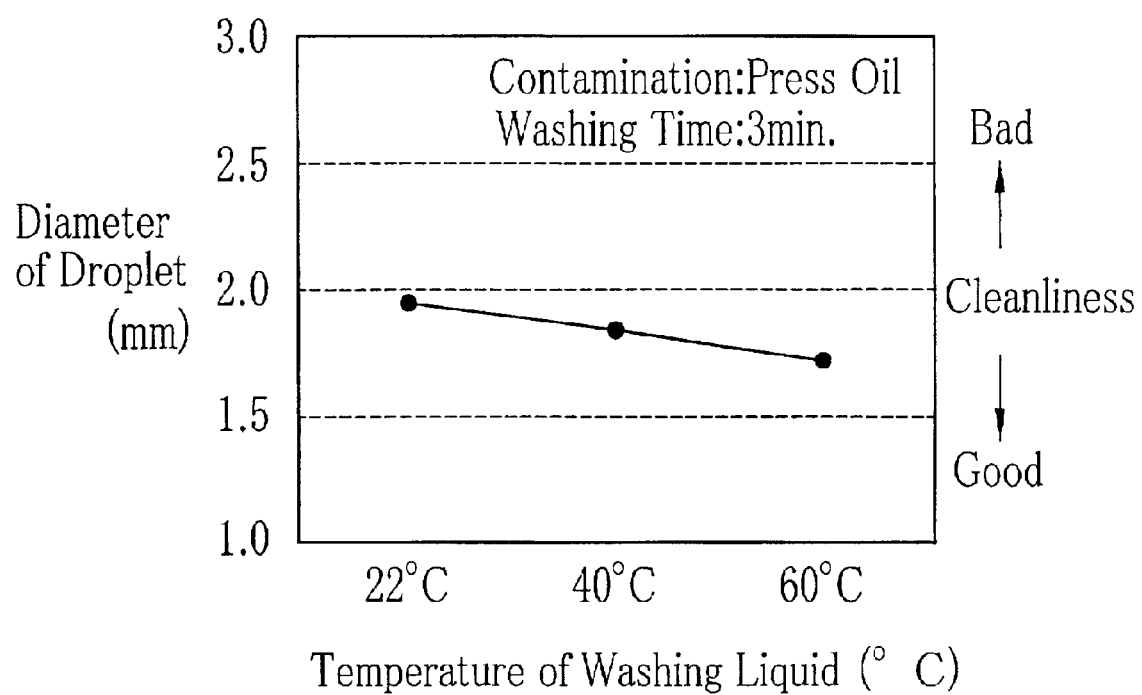
FIG. 15 is a graph showing the relation between temperature of washing water and cleanliness.

The higher the temperature of washing water is, the clearer the washed one becomes. FIG. 15 is a graph showing the relation between temperature of washing water and cleanliness. Conditions for the test is the same except that kind f contamination is a press oil and washing time is fixed to 3 minutes. The graph shows that water of 40° C. gives cleaner surface than the brand-new one and water of 22° C. (averaged temperature of tap water) can still give the same cleanliness as brand-new one. Capacity of washing can be easily controlled by operational condition of washer. Thus the condition, such as temperature of washing liquid, washing time or amount of washing liquid, should be selected in view of saving energy or reducing environment load according to the degree of contamination, time requirement or other washing purpose.

Instead of the punched plate portion, plural of holes may be formed on the tubular shell portion 37*a* of the washing tank 37. Further, wire screen may be also applied. The diameter of holes on the punched plate portion depends on the size of the crushed plastics to be recycled. But a larger diameter increases the amount to be removed by the filter of the hot washing liquid tank, which makes the loss larger. Furthermore, the crushed plastics tend to stop the holes of the punched plate portion. However, when the washing liquid is made to spray on the punched plate portion with a predetermined pressure, the holes are washed to prevent stopping.

The degree of slope of conical bottom formed in the washing tank is 35° in the embodiment. However the present invention is not restricted in it. The degree may be between 20–75°.

Further, not only the hot water is used as the washing liquid, but also a cleaning material or a solvent. However forming too much bubble may make it difficult to keep the stable spiral flow. Therefore solvents or detergents which does not foam too much should be selected.

Furthermore, even if unexpected particles insoluble in water are contained and have a bad influence on the photographic properties, they are effectively diffused and the density thereof is under a predetermined limit. The washing power is very strong. If washing can be completed in a short time, the mixture is transported in a pipeline with turbulence flow and cleaned at the same time.

In the embodiment mentioned above, washing crushed plastics is described. This invention, however, can be applied to washing, dispersing, dissolving or mixing powder-like material which is difficult to be dispersed in the washing liquid because of light specific gravity causing the material to be floated. In such case, the punched plate portion separates a liquid containing particles to the feeding liquid pump and a cleaning pump. The feeding liquid pump can preferably feed a slurry in which the particles are mixed.

In the above description, the filter is installed in the nozzle of the injection molding machine for injecting the recycled plastic. However, instead of the filter is also used in the injection molding machine for injecting the virgin plastic in order to previously preventing the mixture of the unexpected particle.

What we claim is:

1. A method for recycling a used-up plastic product comprising:
   crushing the used-up plastic product into fine chips having a diameter of 2–4 mm;
   washing the fine chips;
   drying the fine chips; and
   feeding the fine chips into a molding line directly without pelletizing to make a re-molded plastic product.

2. The method as defined in claim 1, wherein the molding line includes an injection molding machine comprising a nozzle,
   wherein the nozzle comprises a filter to remove foreign matters from molten plastic formed from the crushed fine chips.

3. The method as defined in claim 1 or 2, wherein the used-up plastic product is a plastic component of a Film with Lens Unit.

4. The method as defined in claim 1 or 2, the re-molded plastic product is a plastic component of a Film with Lens unit.

5. The method as recited in claim 1, further comprising, prior to crushing the used up plastic product into fine chips, crushing the used-up plastic product into coarse chips having a diameter of 20–60 mm.

6. The method as recited in claim 5, further comprising, between crushing the used up plastic product into coarse chips and into fine chips, separating the coarse chips from foreign matters by airflow separation.

7. The method as recited in claim 1, further comprising, between drying the fine chips and feeding the fine chips into a molding line, detecting and separating any metallic substances from the fine chips by eddy current.

8. The method as recited in claim 1, wherein washing the fine chips comprises:

mixing the fine chips with washing liquid in a washing tank;

draining the fine chips and washing liquid through a sink hole in the bottom of the washing tank;

circulating the fine chips and washing liquid through a circulating pipeline; and ejecting the fine chips and washing liquid against a punched plate side of the washing tank to allow some of the washing liquid carrying foreign objects to pass through and be separated from the fine chips.

9. The method as recited in claim 8, further comprising, after the fine chips and washing liquid are ejected against the punched plate:

draining the fine chips and remaining washing liquid through the sink hole; and repeating the circulating, ejecting and draining of the fine chips and washing liquid a predetermined number of times until the fine chips are sufficiently cleaned.

10. The method as recited in claim 9, further comprising, after the fine chips and washing liquid have been circulated, ejected and drained a predetermined number of times, directing the fine chips and washing liquid to a drainer basket, and separating the washing liquid from the fine chips.

11. The method as recited in claim 9, wherein, when the fine chips and remaining washing liquid travel between the punched plate and the sink hole, they travel in a stable spiral flow around the sides of the washing tank.

12. The method as recited in claim 9, wherein the sink hole is partially open to air.

13. The method as recited in claim 1, further comprising, in an injection molding machine arranged in the molding line:

melting the fine chips to form molten plastic; and passing the molten plastic through a cylindrical wall shaped filter, wherein:

during normal injection molding operations, the filter is arranged so that molten plastic passes in a first radial direction through the filter by way of adjustable pathways; and during a cleaning operation, the adjustable pathways are adjusted so that molten plastic passes in a second radial direction opposite the first radial direction to clean the filter.

14. A method for recycling used-up plastic products comprising:

coarse-crushing used-up plastic products to form coarse chips;

separating the coarse chips from other foreign matters;

fine-crushing the coarse chips to form fine chips;

washing the fine chips using a circulation flow including a spiral flow in which interaction between the fine chips helps clean the fine chips without washing agents;

drying the washed fine chips;

removing metallic matters mingled in the fine chips by using a metal detector; and feeding the dried fine chips directly to an injection molding machine comprising a nozzle part equipped with a filter and a flow-switching mechanism for cleaning the filter by backwash reverse filtration.

15. The method as recited in claim 14, wherein the coarse chips have a diameter of 20–60 mm.

16. The method as recited in claim 14, wherein the fine chips have a diameter of 2–3 mm.

17. The method as recited in claim 14, wherein separating the coarse chips from other foreign matters comprises utilizing airflow separation.

18. The method as recited in claim 14, wherein washing the fine chips further comprises:

mixing the fine chips with washing liquid in a washing tank;

draining the fine chips and washing liquid through a sink hole in the bottom of the washing tank;

circulating the fine chips and washing liquid through a circulating pipeline; and ejecting the fine chips and washing liquid against a punched plate side of the washing tank to allow some of the washing liquid carrying foreign objects to pass through and be separated from the fine chips.

19. The method as recited in claim 18, further comprising, after the fine chips and washing liquid are ejected against the punched plate:

draining the fine chips and remaining washing liquid through the sink hole; and repeating the circulating, ejecting and draining of the fine chips and washing liquid a predetermined number of times until the fine chips are sufficiently cleaned.

20. The method as recited in claim 19, further comprising, after the fine chips and washing liquid have been circulated, ejected and drained a predetermined number of times, directing the fine chips and washing liquid to a drainer basket, and separating the washing liquid from the fine chips.

21. The method as recited in claim 18, wherein the sink hole is partially open to air.

22. The method as recited in claim 14, further comprising, in the injection molding machine:

melting the fine chips to form molten plastic; and passing the molten plastic through the filter, wherein:

the filter comprises a cylindrical wall shaped filter;

during normal injection molding operations, the filter is arranged so that molten plastic passes in a first radial direction through the filter by way of adjustable pathways; and during a cleaning operation, the adjustable pathways are adjusted so that molten plastic passes in a second radial direction opposite the first radial direction to clean the filter by backwash reverse filtration.

* * * * *